United States Patent
Ramesh et al.

(10) Patent No.: US 8,973,070 B2
(45) Date of Patent: Mar. 3, 2015

(54) CHANNEL CHANGE LATENCY REDUCTION

(75) Inventors: Sridhar Ramesh, Carlsbad, CA (US); Curtis Ling, Carlsbad, CA (US); Ramakrishna Akella, San Diego, CA (US); Brenndon Lee, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 435 days.

(21) Appl. No.: 12/036,949

(22) Filed: Feb. 25, 2008

(65) Prior Publication Data
US 2008/0209499 A1 Aug. 28, 2008

Related U.S. Application Data

(60) Provisional application No. 60/891,460, filed on Feb. 23, 2007.

(51) Int. Cl.
*H04N 7/173* (2011.01)
*H04H 60/43* (2008.01)
*H04H 20/26* (2008.01)
*H04N 21/414* (2011.01)
*H04N 21/438* (2011.01)
*H04H 20/40* (2008.01)
*H04H 60/11* (2008.01)

(52) U.S. Cl.
CPC .............. *H04H 60/43* (2013.01); *H04H 20/26* (2013.01); *H04N 21/41407* (2013.01); *H04N 21/4384* (2013.01); *H04H 20/40* (2013.01); *H04H 60/11* (2013.01)
USPC ............................ 725/105; 725/117; 725/111

(58) Field of Classification Search
None
See application file for complete search history.

(56) References Cited

U.S. PATENT DOCUMENTS

| 5,594,491 | A | 1/1997 | Hodge et al. |
| 6,496,980 | B1 | 12/2002 | Tillman et al. |
| 6,763,025 | B2 * | 7/2004 | Leatherbury et al. .... 370/395.64 |
| 7,028,096 | B1 | 4/2006 | Lee |
| 2004/0044789 | A1 | 3/2004 | Angel et al. |
| 2004/0085891 | A1 | 5/2004 | Henriksson |
| 2004/0120285 | A1 * | 6/2004 | Paila et al. .................... 370/331 |
| 2005/0060754 | A1 * | 3/2005 | Simyon ........................ 725/112 |

(Continued)

OTHER PUBLICATIONS

International Search Report and Written Opinion mailed Jun. 27, 2008 in PCT/US 08/54915 filed Feb. 25, 2008.

*Primary Examiner* — Brian T Pendleton
*Assistant Examiner* — Jean D Saint Cyr
(74) *Attorney, Agent, or Firm* — Kilpatrick Townsend & Stockton LLP

(57) ABSTRACT

A wireless communication system is enhanced to allow for low-latency channel surfing and to enable a user to quickly see the content carried over a selected channel while searching channels for desired content. The techniques for reducing the channel change latency may be implemented in a transmitter, receiver, or in a combination of transmitter and receiver. The wireless communication system is optionally a DVB-H communication system. The transmitter may generate and transmit one or more auxiliary channels, where each auxiliary channel contains reduced resolution content corresponding to one or more channels. The receiver may process the one or more auxiliary channels to present the reduced resolution content while processing the full resolution channel for display. The receiver caches portions of content from one or more non-selected channels and presents the cached content when the channel is selected while concurrently searching and processing the full resolution channel content.

17 Claims, 7 Drawing Sheets

(56) References Cited

U.S. PATENT DOCUMENTS

| | | |
|---|---|---|
| 2005/0175099 A1 | 8/2005 | Sarkijarvi et al. |
| 2006/0135127 A1 | 6/2006 | Aarnio et al. |
| 2006/0254409 A1 | 11/2006 | Withop |
| 2006/0280479 A1* | 12/2006 | Mita et al. ................ 386/96 |
| 2007/0074267 A1* | 3/2007 | Clerget et al. ............. 725/136 |
| 2007/0088971 A1* | 4/2007 | Walker et al. ................. 714/4 |
| 2008/0022340 A1* | 1/2008 | Hannuksela et al. ....... 725/112 |
| 2008/0092203 A1* | 4/2008 | Bouazizi et al. ........... 725/135 |
| 2008/0216116 A1* | 9/2008 | Pekonen et al. ............ 725/39 |
| 2010/0111168 A1* | 5/2010 | Villion et al. ........... 375/240.12 |

* cited by examiner

500

600

| Logical Channel | IP Address | PID |
|---|---|---|
| 1 | $A_1$ | $P_1$ |
| 2 | $A_2$ | $P_2$ |
| K | $A_K$ | $P_K$ |

PID lookup table (K entries)

Figure 7

MPEG-2 TS format

| Syntax | No. of bits | Mnemonic |
|---|---|---|
| transport_packet(){ | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control=='10' \|\| adaptation_field_control=='11'){ | | |
|         adaptation_field() | | |
|     } | | |
|     if(adaptation_field_control=='01' \|\| adaptation_field_control=='11') { | | |
|         for (i=0;i<N;i++){ | | |
|             data_byte | 8 | bslbf |
|         } | | |
|     } | | |
| } | | |

Figure 8

CHANNEL CHANGE LATENCY REDUCTION

CROSS-REFERENCES TO RELATED APPLICATIONS

The present application claims benefit under 35 USC 119 (e) to U.S. Provisional Application No. 60/891,460, filed on Feb. 23, 2007, entitled "Channel Change Latency Reduction In DVB-H Receivers", the contents of which is incorporated herein by reference in its entirety.

BACKGROUND OF THE INVENTION

The present invention relates to wireless communication systems, and more particularly to reducing the latency experienced by users whilst scanning through available content, such as television programs, in a DVB-H based wireless communication system.

A wireless communication system implementing Digital Video Broadcasting for Handheld (DVB-H) typically offers a variety of programming (content) for presentation to a user of a mobile receiving device. The content typically includes video content to be displayed on the mobile receiver, but in general, the content carried in any particular channel is not limited to content or media having a video portion. The user of a mobile device or DVB-H receiver may operate the device in a manner that is most analogous to the operation of a television or radio. The user may selectively tune or otherwise control the mobile device to receive a particular channel from a channel line-up or catalog. Briefly scanning channels for desired content is typically referred to as channel "surfing." In the following, the term channel is understood to refer to a logical channel that may be selected by the user, and the physical channel on which the signal is received is referred to alternatively as the frequency.

Channel switching latency arises because the DVB-H standard recommends time-slicing to reduce the power consumed by receivers while receiving a video stream. A time slice burst could contain as much as 191 KB of application data belonging to one or more media streams being viewed by an end user. Further, since the peak data rate is as high as approximately 20 Mbps and the average data rate is as low as approximately 384 Kbps, time slice bursts of a single service could be spread apart in time by as much as 5 seconds. Typically, the receiver is aware of the time of arrival of the next time slice burst of interest and turns its radio front end off at other times in order to conserve power.

When a user requests (via the user terminal or interface) to view a new channel, the mobile TV application maps the request to an IP stream carried within the DVB-H time slices by looking up a menu of available programs in an Electronic Service Guide (ESG). This IP stream is in turn mapped in the DVB-H receiver to a program, comprising MPEG-2 transport stream (TS) packets bearing a unique packet identifier (PID). These TS packets carry their payload datagrams in the MPE (multi-protocol encapsulation) syntax.

The receiver must open up or otherwise energize its radio front end until TS packets bearing the selected PID are received, which may be for up to 5 seconds in the worst case. Further, a complete burst may need to be received before packet errors are corrected via Reed-Solomon decoding, and the user may view the video from the selected channel.

Since a burst may be as large as 256 KB, the memory available in the receiver device limits the number of streams that may be received and transferred to an application for storage in anticipation of a channel-change request by the user. It is typically undesirable to monitor and store all available channels, because of the amount of memory needed to support all channels. Additionally, the receiver would suffer from reduced battery life, because the receiver would need to monitor all time slices and thus could not offer any power savings available through time slicing.

However, reducing the channel change latency is advantageous for providing a favorable user experience. Users typically do not experience latencies on the order of 5 seconds when changing channels on other communications systems, such as television or radio broadcast systems. It is desirable to reduce channel changing latency in a DVB-H wireless communication systems in order to provide a comparable, if not more favorable, user experience.

SUMMARY OF THE INVENTION

In accordance with one embodiment of the present invention, low-latency channel surfing in a wireless communication system is achieved, thus enabling the content viewer to quickly see the contents carried over a selected channel while searching channels for the desired content. In one embodiment, the wireless communication system is a DVB-H system. Apparatus and methods for reducing channel change latency in, for example, a DVB-H system may be implemented in a transmitter, receiver, or in a combination of transmitter and receiver. The transmitter may be configured to generate and transmit one or more auxiliary streams or channels, where each auxiliary channel contains reduced resolution content corresponding to one or more channels. The receiver may be configured to process the one or more auxiliary channels to present the reduced resolution content while processing the full resolution channel for display. The receiver may be configured to cache portions of content from one or more non-selected channels. The receiver presents the cached content when the channel is selected while concurrently searching and processing the full resolution channel content.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 7 shows an example of a PID lookup table.

FIG. 8 shows an MPEG-2 transport stream (TS) packet format.

DETAILED DESCRIPTION OF THE INVENTION

Figure 1:
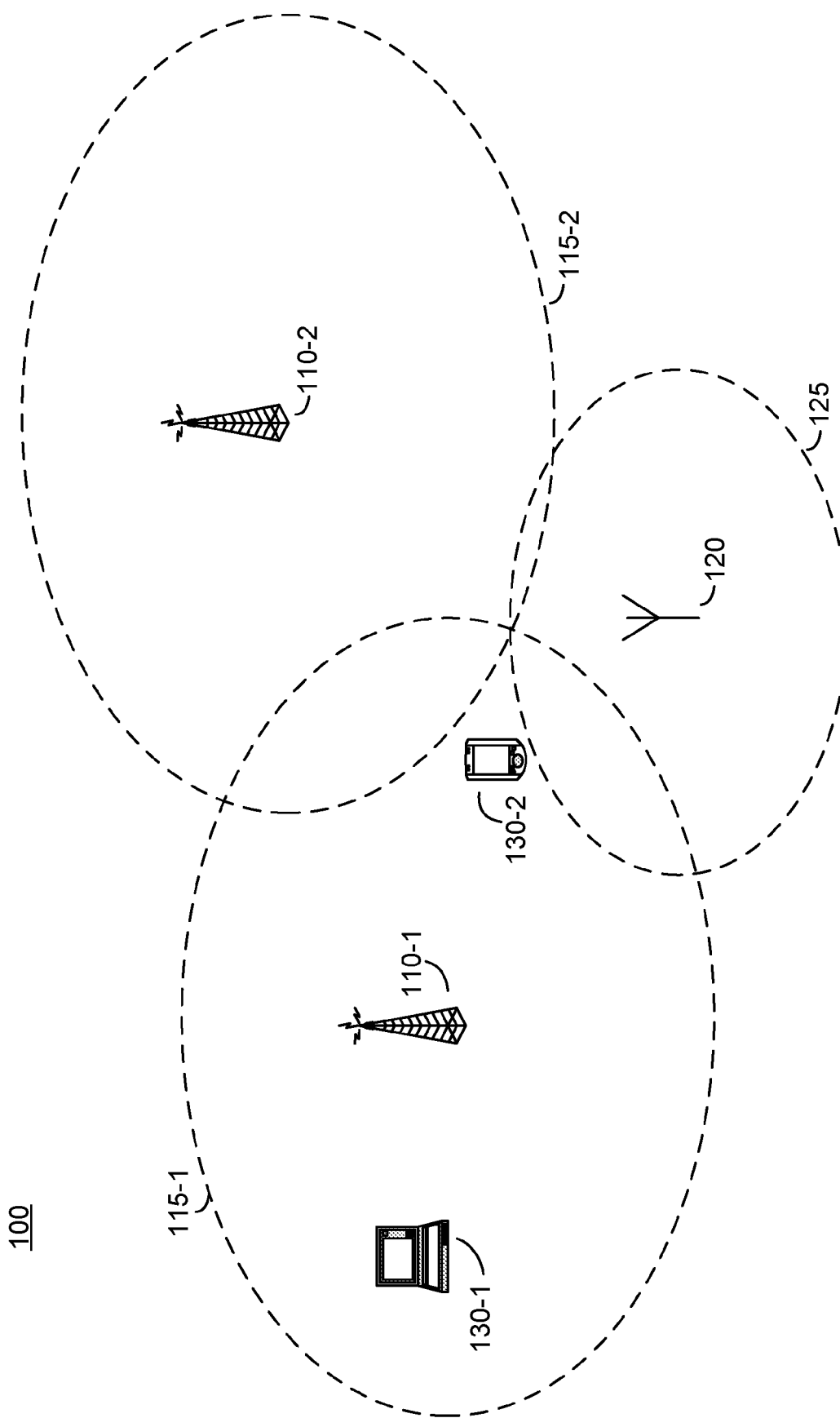
FIG. 1 is a simplified functional block diagram of a wireless communication system having reduced channel change latency, in accordance with one exemplary embodiment of the present invention.

Effective or actual channel change latencies are reduced in a communication system by implementing optimizations in a broadcast transmitter, a receiver, or in a combination of broadcast transmitter and receiver. One such communication system is a DVB-H communication system.

In accordance with one embodiment of the present invention, a broadcast transmitter is adapted to transmit one or more auxiliary streams. Each auxiliary stream includes reduced resolution content corresponding to the full resolution content carried on one or more channels. The reduced resolution content may be generated by reducing the quality of images, by reducing the frame rate of video content, increasing compression ratios, and the like, or some combination thereof. For example, an auxiliary stream may be configured to carry a reduced resolution version of a single corresponding primary stream or channel. The auxiliary stream may be configured with a time slice that is the same as or different from the time slice of the primary channel. The amount of information in each auxiliary stream time slice may be less than the information for each scheduled time slice of the primary channel. Additionally, the time slice for the auxiliary channel may occur more frequently than the time slice for the primary channel. The structure of the auxiliary channel and its time slice permits the receiver to more quickly acquire and present the reduced resolution content carried in the auxiliary channel.

In accordance with another embodiment of the present invention, the transmitter may configure an auxiliary channel as a composite auxiliary channel, where a composite auxiliary channel includes reduced resolution content for a plurality of primary streams or channels. In one embodiment, an auxiliary channel may include reduced resolution content for a majority, if not all, primary channels. Each composite auxiliary channel may have its own IP address regardless of the number of reduced content streams aggregated in the composite auxiliary stream. In one example, a composite auxiliary stream may be included in one or more predetermined streams. For example, the stream bearing the Electronic Service Guide (ESG) may include a composite stream of some or all reduced resolution streams.

To further facilitate receipt of primary streams, each auxiliary stream or composite auxiliary stream may include delta-t time offset information relating a time offset of the time slice of the primary stream relative to the time slice for the auxiliary stream or composite auxiliary stream. An auxiliary stream may include a delta-t time offset corresponding to a time slice of its corresponding primary stream, and a composite auxiliary stream can include a delta-t time offset value for each of the primary streams included in the composite stream.

In a system implementing one or more auxiliary streams, the receiver may be configured to initially search for and process the reduced resolution content from the auxiliary stream prior to processing a primary stream. The receiver need not ever process some primary streams in situations where the user is rapidly changing channels in search of desired content.

In other embodiments, the receiver, such as the DVB-H receiver, may be optimized to reduce channel change latency independent of any changes implemented in the broadcast transmitter. The changes to the receiver may be implemented independent of the changes to the broadcast transmitter or in conjunction with receiver modifications that capitalize on changes to the broadcast transmitter.

In one embodiment, the receiver may be configured to cache at least portions of streams that are not presently active within the receiver. That is, the receiver may process one or more streams to cache content from one or more channels that do not correspond to the channel selected by the user.

The receiver may be configured to determine which inactive streams to process and cache based on an operating mode of the receiver and one or more predetermined channel lists. The operating mode may be expressly selected by the user or may be entered based on one or more events, such as user inputs typically associated with channel surfing.

For example, in an express activation embodiment, the receiver may include a user input selection that initiates a surf mode. The surf mode becomes active and the stream caching occurs until the user deactivates the surf mode. The receiver may permit deactivation of surf mode through user interaction, an occurrence of one or more predetermined events, and the like, or some combination thereof. For example, the receiver may deactivate surf mode if the user remains on a particular channel for greater than a predetermined deactivation period, which may be static or dynamic.

The identities of the channels that are processed and cached may be predetermined, or may be determined dynamically, based on one or more receiver operating parameters. In one embodiment, the user may program or otherwise compile one or more user catalogs, folders, or lists of channels. For example, the receiver may permit the user to generate one or more favorites lists, where each favorites list can include a selection of channels. In another embodiment, the receiver monitors user selections and compiles a list of probable channel selections. In another embodiment, the receiver can generate a list of adjacent channels based on an identity of an active channel.

The receiver may process and cache portions of the channels in a channel list based on user action. For example, when the user is surfing through a favorites list, the receiver can process and cache content from the channels in the favorites list. When the user is surfing through channels by random selection, the receiver may process and cache content from channels that are most frequently selected by the user or those most recently selected by the user. If the user is using channel up or down controls, the receiver can process and cache contents from adjacent channels.

The receiver may cache a subset of the information on non-active channels, in order to reduce the memory required to cache content. For example, the receiver may generate microslices of each time slice corresponding to a particular channel and cache the microslices in a microcache. If the user selects a channel that is cached, the receiver initially presents the cached contents while searching for and processing the next time slice for the selected channel.

FIG. 1 is a simplified functional block diagram of an exemplary embodiment of a wireless communication system 100 implementing DVB-H and having reduced channel change latency, in accordance with one embodiment of the present invention. Although, the following description is provided with reference to a DVB-H communication system, it is understood that the present invention is applicable to other communication systems. The enhancements for reducing channel change latency may be implemented within the broadcast transmitters, receivers, or combination of broadcast transmitters and receivers.

In the example of FIG. 1, two broadcast transmitters 110-1 and 110-2 are shown along with two receivers 130-1 and 130-2 and a repeater 120. However, it is understood that a DVB-H system may implement one or more broadcast transmitters, and each transmitter may have zero or a plurality of repeaters. Additionally, each broadcast transmitter or repeater may typically support any number of receivers within its corresponding coverage area.

A first broadcast transmitter 110-1 may support an associated first coverage area 115-1, and may broadcast content over the first coverage area 115-1. The first broadcast transmitter 110-1 may be supported by a repeater 120. The repeater 120 may support a repeater coverage area 125 that typically overlaps a portion of the first coverage area 115-1. The repeater 120 may be configured to effectively extend the coverage area supported by the first broadcast transmitter 110-1.

The first broadcast transmitter 110-1 may be configured to communicate the broadcast content to the repeater 120 using a wired or wireless communication link. In one embodiment, the repeater 120 receives the content broadcast by the first broadcast transmitter 110-1 and rebroadcasts it over the repeater coverage area 125. In another embodiment, the first broadcast transmitter 110-1 communicates the content information to the repeater 120 over a wired link, and the repeater 120 operates to broadcast the content over the repeater coverage area 125.

Similarly, a second broadcast transmitter 110-2 may be configured to support a corresponding second coverage area 115-2. The second coverage area 115-2 may overlap the first coverage area 115-1 and the repeater coverage area 120, but is not limited to such overlap. The second broadcast transmitter 110-2 may be configured to broadcast content that is substantially similar to the content broadcast by the first broadcast transmitter 110-1 or may be configured to broadcast content that is at least partially distinct from the content broadcast by the first broadcast transmitter 110-1. For example, the first and second broadcast transmitters 110-1 and 110-2 may be part of a linked system controlled by a single content or service provider or may be controlled by distinct content or service providers.

One or more receivers 130-1 and 130-2 may be within any of the coverage areas, and may receive the content from one or more transmitters supporting the coverage areas. A first receiver 130-1 may be, for example, a portable receiver that may be moved to virtually any location within any of the coverage areas, but may typically be stationary during processing of content. A second receiver 130-2 may be, for example, a mobile receiver that may be in motion during processing of content. Of course, the system 100 does not require that receivers 130-1 or 130-2 be mobile or portable, and may support stationary receivers.

The broadcast transmitter may or may not be configured to support a plurality of primary content channels and one or more auxiliary channels. Each broadcast transmitter may indicate the presence of one or more auxiliary channels, for example, in the ESG. The receivers 130-1 and 130-2 may be configured to tune to and receive the content from at least one of the primary content channels based on user input. The receivers may access and process the auxiliary channels if they are available.

One or more of the receivers may implement enhancements relating to caching portions of at least one non-active channel in order to reduce channel change latency. The receiver may initially present the cached contents in response to user input changing a channel to one of the cached channels. The receiver may search and process the primary channel, if necessary, while the cached contents are being presented.

Figure 2:
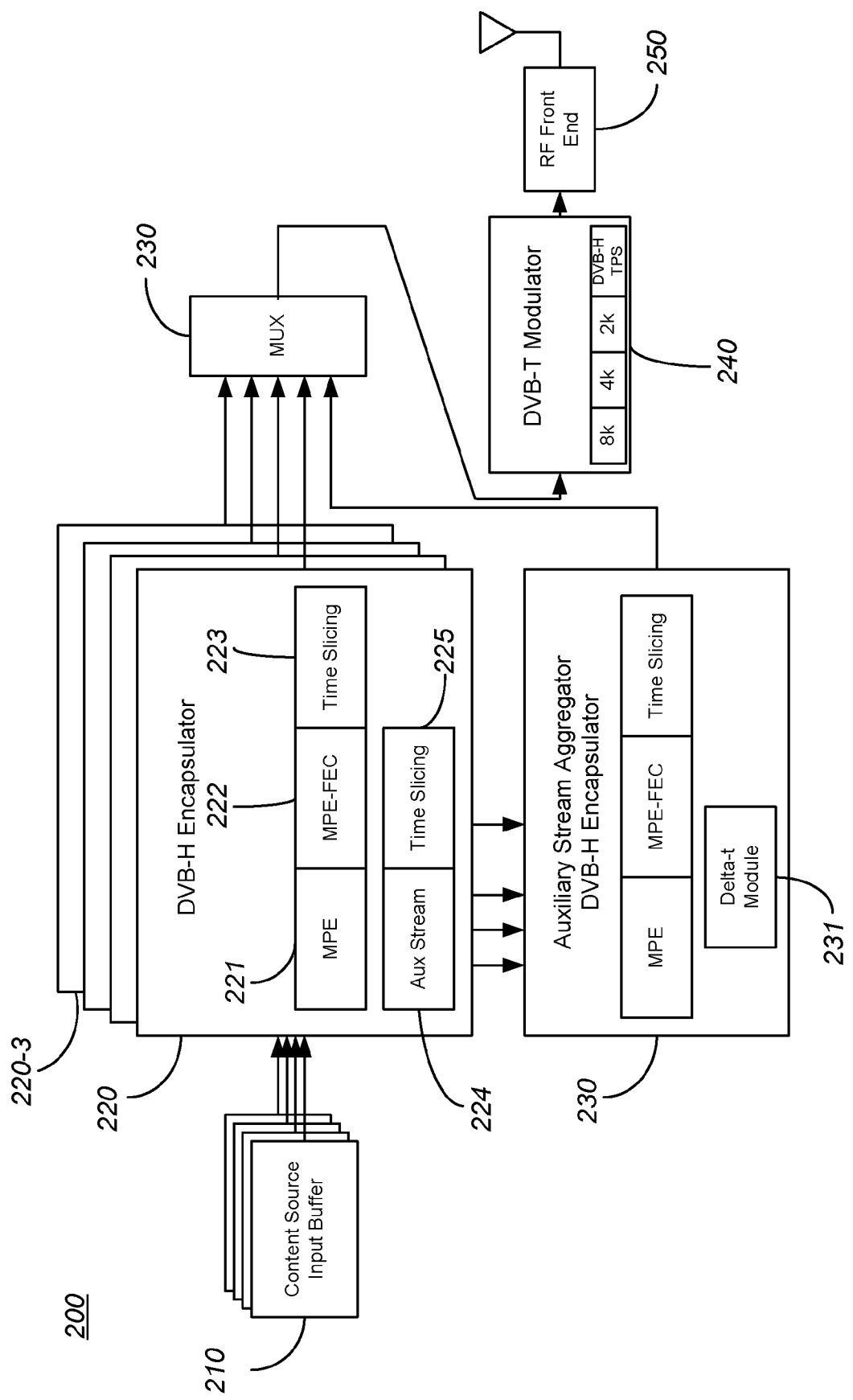
FIG. 2 is a simplified functional block diagram of a DVB-H transmitter with reduced channel change latency, in accordance with one exemplary embodiment of the present invention.

FIG. 2 is a simplified functional block diagram of an embodiment of a DVB-H transmitter 200 supporting reduced channel change latency, in accordance with one embodiment of the present invention. The transmitter is shown as including a plurality of DVB-H encapsulators 220 that are each configured to encapsulate a corresponding content stream. The encapsulator processes registered IP traffic, called services, into DVB-H compliant MPEG-2 stream. The encapsulator also prepares and schedules bursts of MPE-FEC frames according to the parameters of the registered services. Such an encapsulator is well known in the art and is available commercially from many different companies.

The time-slicing module 223 is used to reduce the average power consumption of the transmitter (and receiver) and enable smooth and seamless service handover. Time-slicing consists of sending data in bursts using significantly higher instantaneous bit rate compared to the bit rate required if the data were transmitted using traditional streaming mechanisms. To indicate to the receiver when to expect the next burst, the time (delta-t) to the beginning of the next burst is indicated within the burst. Between the bursts, data of the primary stream is not transmitted, allowing other auxiliary streams to use the bandwidth otherwise allocated. Time-slicing enables a receiver to stay active only a fraction of the time, while receiving bursts of a requested service.

The optional MPE-FEC module 222 improves the C/N (carrier-to-Noise ratio) and Doppler performance in mobile channels and the tolerance to impulse interference. This is accomplished through the introduction of an additional level of error correction at the MPE layer. By adding parity information calculated from the data streams and sending this parity data in separate MPE-FEC sections, error-free data streams may be output after MPE-FEC decoding. With MPE-FEC a flexible amount of the transmission capacity is allocated to parity overhead. For example, for a given set of transmission parameters providing 25% of parity overhead, the MPE-FEC may require about the same C/N as a receiver with antenna diversity. In addition MPE-FEC provides good immunity to impulse interference.

Each encapsulator is shown as including an optional auxiliary stream processor 224 and time slicing module 225. The time-slicing module 225 associated with the auxiliary stream processor 224 performs similar function to module 223 described above. The auxiliary stream processor generates one or more auxiliary streams that include reduced resolution content of the one or more channels being broadcasted. Although FIG. 2 illustrates the auxiliary stream processing and time slicing performed in the same encapsulator that operates to encapsulate the corresponding primary stream, the auxiliary stream encapsulator may be separate and distinct from the primary stream encapsulator.

In the embodiment of FIG. 2, each encapsulator 220 outputs an encapsulated primary stream and an encapsulated auxiliary stream to a multiplexer 230 for time slicing. The primary stream and auxiliary stream need not, and typically do not, have coincident time slices. The relationship between the primary and auxiliary stream time slices may be related or may be independent and asynchronous.

The transmitter also includes an optional auxiliary stream aggregator 230 that is configured to aggregate portions of a plurality of primary streams and generate a composite auxiliary stream. Such composite auxiliary streams may contain, for example, reduced resolution content of one or more primary channels. FIG. 2 illustrates a single auxiliary stream aggregator, but other transmitter embodiments may utilize more composite auxiliary streams or may completely eliminate composite auxiliary streams.

The auxiliary stream aggregator may include a delta-t module 231 that is configured to determine a time offset between the time slice bursts of the primary channels relative to the time slice of the composite auxiliary channel. The delta-t module 231 may be configured to insert or otherwise populate the time offset value into a field in the auxiliary stream. The auxiliary stream encapsulator may generate content of the auxiliary stream or receive it from an external module. In one example, it encapsulates this content in packets, and inserts the time slice information of the primary stream as well as that of the auxiliary stream in these packets, and inserts an identifier that allows the receiver to relate this auxiliary stream to its primary channel.

The DVB-T Modulator 240 is well-known. The RF front end 250 is capable of dispersing the signals received from the DVB-T modulator and is also well known.

Figure 3:
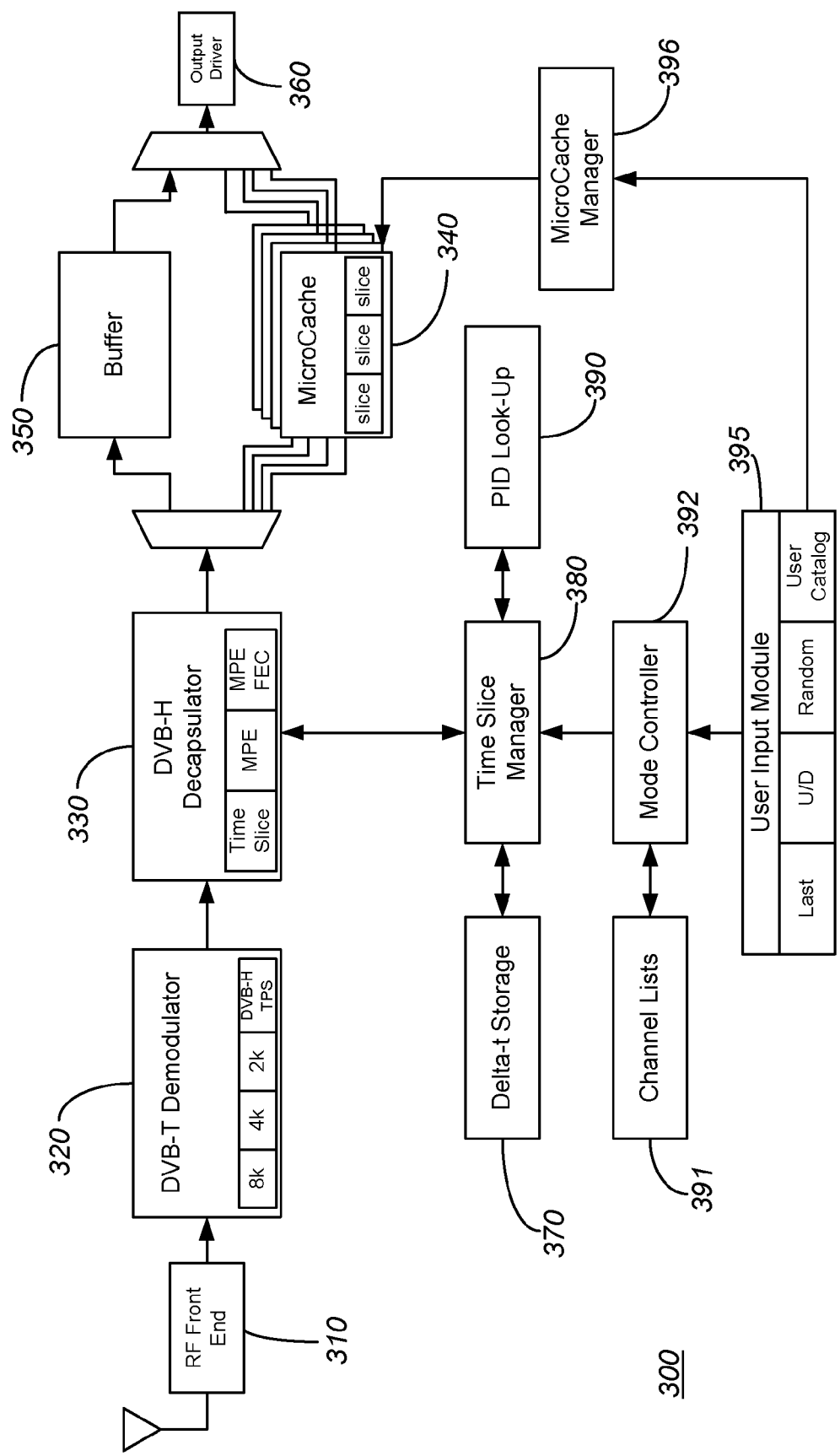
FIG. 3 is a simplified functional block diagram of a receiver adapted to provide low channel change latency, in accordance with one exemplary embodiment of the present invention.

FIG. 3 is a simplified functional block diagram of a receiver 300 adapted to provide low channel change latency, in accordance with one exemplary embodiment of the present invention. The receiver may be implemented, for example, within one of the receivers of the system of FIG. 1 and may be configured to interface with the transmitter 200 of FIG. 2. The receiver may be configured to reduce channel change latency in association with, or independent of, channel change latency reduction enhancements implemented within the broadcast transmitter.

The DVB-T demodulator 320 recovers the MPEG-2 Transport Stream packets from the received DVB-T RF signal. It offers three transmission modes 8K, 4K and 2K with the corresponding Transmitter Parameter Signaling (TPS). A DVB-T demodulator is well known in the art.

The receiver is shown as including a decapsulator 330 configured to operate on DVB-H time slices at times determined by the time slice manager 380. The time slices may coincide with the active or selected channel as well as one or more channels being monitored and processed for channel change latency reduction.

The receiver may generate a microslice for each of the non-active channels being monitored and may store the microslice in the appropriate microcache 340. A mode controller 392 determines a receiver's operating mode based on input provided to a user input module 395. The mode controller 392 determines which, if any, of a plurality of possible channel surfing modes for which the receiver is configured.

The mode controller 392 may access a channel list in order to control the time slice manager 380 to retrieve and process a particular channel stream. The time slice manager may access a delta-t storage 370 that stores delta-t information that may be received from auxiliary channels. The delta-t or time offset information may facilitate synchronization of the time slice processing. The time slice manager 380 may also access a PID table 390 to determine the packet information for the desired channels.

Channel-Surf Mode

The channel-surf mode is an operating mode where the DVB-H receiver is configured to receive more than one time-sliced stream. This mode of operation may be selected explicitly by the user by input via the user interface, or implicitly by the application via a "smart algorithm". An example of a smart or adaptable algorithm is where the application switches to channel-surf mode when the user requests a channel change by selecting a channel or via the up-down keys.

The receiver may remain in channel surf mode for a certain period of time, before returning to normal operation. This may be implemented by the use of a timer. For instance, the receiver may remain in channel surf mode for 15 seconds (or 1 second, 2 seconds, or 60 seconds or any shorter or longer durations) after the user requests a channel change. If the user requests no further channel change after 15 seconds, the receiver may revert to normal mode.

The channel-up-down feature is a utility for the user to specify adjacent logical channels to switch the reception of streams. If the logical channels are numbered in a sequence from, for example, 1 through N, a user viewing video stream of logical channel n may select to switch logical channels to receive logical channel n+1 (or n−1) using a channel up (or down) key. The channel up/down keys are expected to be used extensively by users to explore and sample the services available on their mobile device, such as when operating as a handheld TV.

Favorites List

The receiver may be configured to build a favorites list that reflects the logical channels the user is most likely to visit. The list may be built based on user inputs or using a "smart" algorithm or a combination of both. Examples of smart algorithms are: i) Most recently viewed, ii) Most frequently viewed. This information is used by the receiver to receive the appropriate time slices on entering channel surf mode. The receiver may rate the channels in the favorites list by assigning a rank (1, 2, 3, etc) or assigning a weight (100, 75, 25, etc). The amount of content cached from each stream, and the frequency with which the content corresponding to the channel is cached/updated could be determined by the rating (ranking or weight) assigned to the channel. This is accomplished by implementing an optional microcache manager module 396 in the receiver 300.

Alternatively or additionally, the user may expressly generate one or more favorite lists and the microcache manager 396 will instruct the microcache 340 to store content and real-time information corresponding to these lists. The receiver may be configured cycle through the channels of a particular user defined list in response to an request by the user. In another embodiment, the microcache manager may create a caching strategy based on analyzing the receiver memory constraints, the receiver power usage, and the desired user experience. The caching strategy thus created will determine which channels and what content are stored in the microcache. In still another embodiment, the caching strategy may be predefined in the microcache manager.

The Micro-Slice and Micro-Cache

Figure 4:
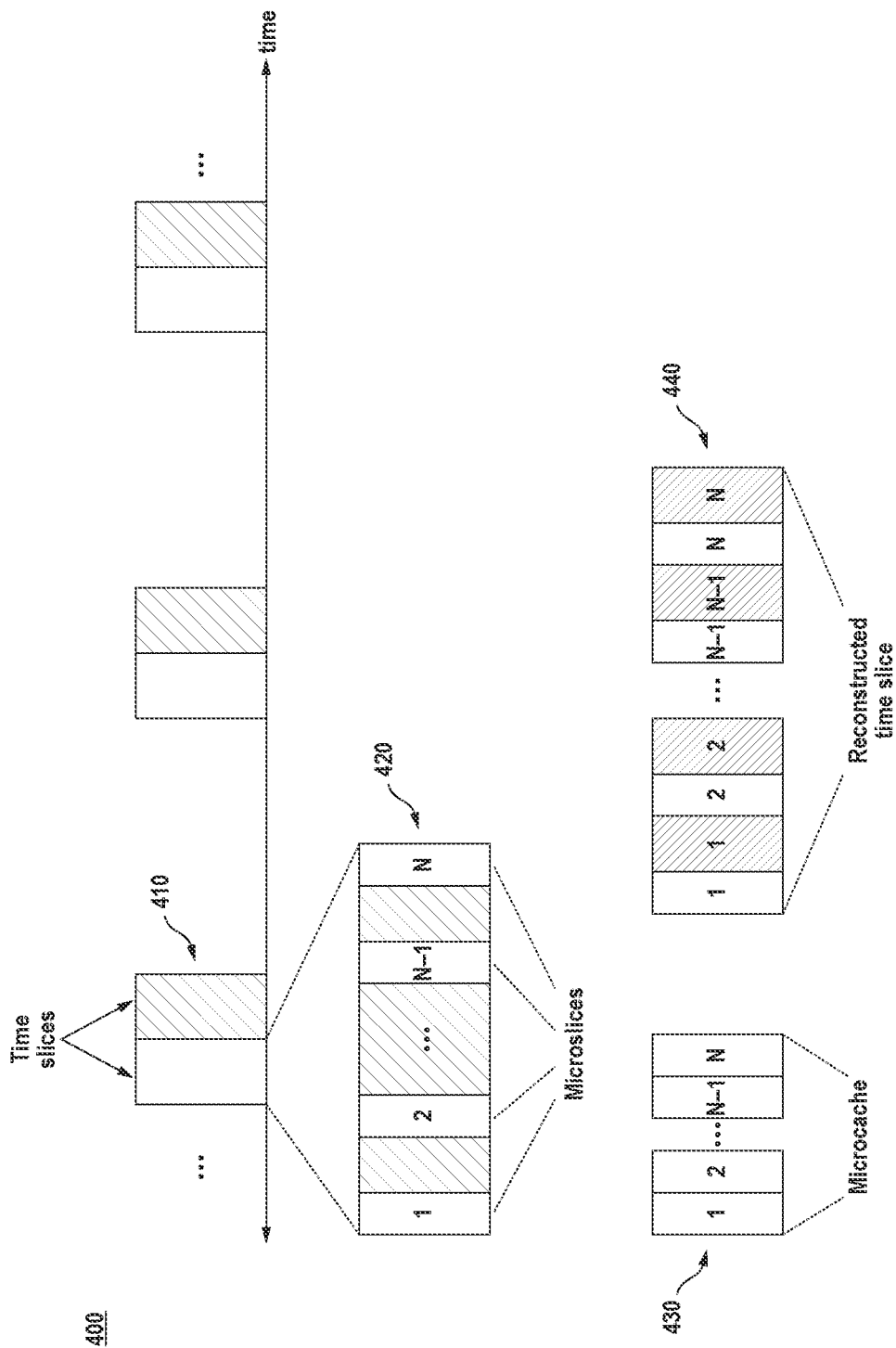
FIG. 4 is a simplified timing diagram illustrating time slices, microslices, microcaches, and a reconstructed time slice generated by stitching together the microslices contained in the microcache, in accordance with one exemplary embodiment of the present invention.

Instead of storing an entire time slice 410, the receiver may be configured to store a series of subsequences, or microslices 420, of the time slice 410, thereby providing the viewer with a facsimile of motion video while reducing the amount of storage space required. A microslice may be defined as a run of correctly received and channel-decoded MPE sections within a time-slice. A microcache 430 is defined as the entire series of microslices comprising a sequence of motion video. The concept of microslices derived from time slices, their storage in a microcache, and the subsequent reconstruction 440 of microslices to a time slice is illustrated in FIG. 4.

In an embodiment, a receiver could, for example, be configured to build a microcache by storing 20% of all received MPE sections, such as by storing a 100 millisecond microslice, waiting 400 milliseconds, and then repeating. The sequence of micro-slices comprising the microcache may then be "stitched" together or otherwise aggregated or combined to form a motion video sequence, albeit at somewhat lower quality, where quality is traded off against required storage memory. In this example, the micro-cache for a given channel would require 20% of the memory that would otherwise be required if the full time slice was stored. Of course, the percentage of stored microslice is not limited to 20%, and need not be a fixed ratio. Instead, the percentage may be, for example, about 5%, 10%, 20%, 25%, 30%, 40%, 50%, 60%, 70%, 75%, 80%, 90%, 100% or some other percentage. The percentage may be dynamically determined based on the number of channels that are monitored and the size of the cache area. For example, microcaching of streams from a user favorites list having only two channels may utilize a higher percentage of stored microslices than microcaching of streams for a user favorites list having ten distinct channels. In the extreme, a receiver could simply store one frame for each channel, to provide basic visual information about the program (e.g. news, sports, movie); the frame may be updated periodically at a rate determined by memory availability and/or the user. Alternatively, the receiver could store a series of frames for one or more inactive channels, and may be configured to display the frames in a slide presentation to represent the content on the channel.

A receiver may store micro-caches of some or all of the logical channels in the favorites list, limited by available memory. More generally, the storage space allocated in the micro-cache may vary on a per logical channel basis, and could be determined by a ranking or rating of a given logical channel. For instance, a channel with a higher rating or ranking could be allocated a larger micro-cache than one with a lower rating or ranking. These ratings or rankings could be built on user inputs or by means of a smart algorithm. When the user changes to a logical channel in the favorites list, the receiver first plays out the corresponding micro-cache while attempting to access the service in the background.

One way to implement the microcache is to have each micro-slice save consecutively received MPE (multi-protocol encapsulation) sections that pass the link layer error check CRC (cyclic redundancy check) and maintain:

1. A timer showing the time of caching, and
2. A counter showing the number of sections cached.

When any received section fails CRC, it freezes the count at μSliceCount. This cached portion of the stream is a micro-slice of size μSliceCount.

Each micro-cache consists of a sequence of micro-slices, and maintains time of the last micro-slice in the sequence.

Another mode of operation is for the receiver to continuously update the micro-slice cache with each time slice, turning the receiver on for each time slice corresponding to the channel being stored.

Subsampled Microcache

A second, more power-efficient mode, is to update the micro-cache only periodically ("subsampled" for example, once every minute). This means that the micro-cache will contain a slightly "stale" representation of the content which is periodically refreshed at a frequency that may be adjusted to trade off freshness against power consumption. An additional advantage of this approach is that it allows channels located in time slices at different frequencies but coincidental times to be micro-cached so that changing the channel to either channel may be done with low latency. In this manner, a very large number of channels may be micro-cached in spite of the fact that they reside at different frequencies and time slices which at least partially coincide.

PID Look-Up Table

The receiver may be configured to maintain a PID look-up table 390 to assist in fast look-up of the PID value corresponding to an IP stream. The receiver may maintain the mappings from each IP stream that the user may have access to, or may cache only those entries of a high user interest, that the user is likely to request within a short time. In particular, the IP streams corresponding to the logical channel up down requests and the IP streams corresponding to the most recently and most frequently used logical channels could be understood as streams that the user has a high likelihood of requesting next. An example of a PID look-up table is presented in FIG. 7.

Delta_T Parsing

Delta_t parsing is a technique wherein a receiver creates a table of future time-slice reception times based on receiving small portions of time-slices of certain selected services, such as those in the favorites list. The delta_t information is contained in the header of MPE and MPE-FEC sections, so the receiver only needs to receive one or two sections within a time-slice that pass CRC to perform delta_t parsing.

Details of Operation

The receiver, upon entering surf mode, is able to receive packets from several IP streams, such as the IP streams corresponding to the entries in the PID look-up table. The PID filter is either disabled or configured to filter in all the entries in the look-up table. There may be a limitation posed by the available memory at the receiver. To work around this limitation, the receiver may be configured to only buffer the "high interest" frames and the "low interest" frames are discarded. The determination of whether a frame is of high or low interest may be made in one of several ways:

1. The transmission system or the content provider may encode this information into the frame prior to its transmission. A "drop priority" field in the frame could be one example to signal whether the frame is of "high interest". The transport_priority flag (see FIG. 8) is one option to signal this information.
2. The receiver could contain the intelligence to determine whether the frame is of "high" or "low" interest. For instance, an I-frame contained within an MPEG-2 encoded stream is regarded as of high interest. P-frames and B-frames are considered "low interest" frames in comparison.

Auxiliary Streams

Figure 5:
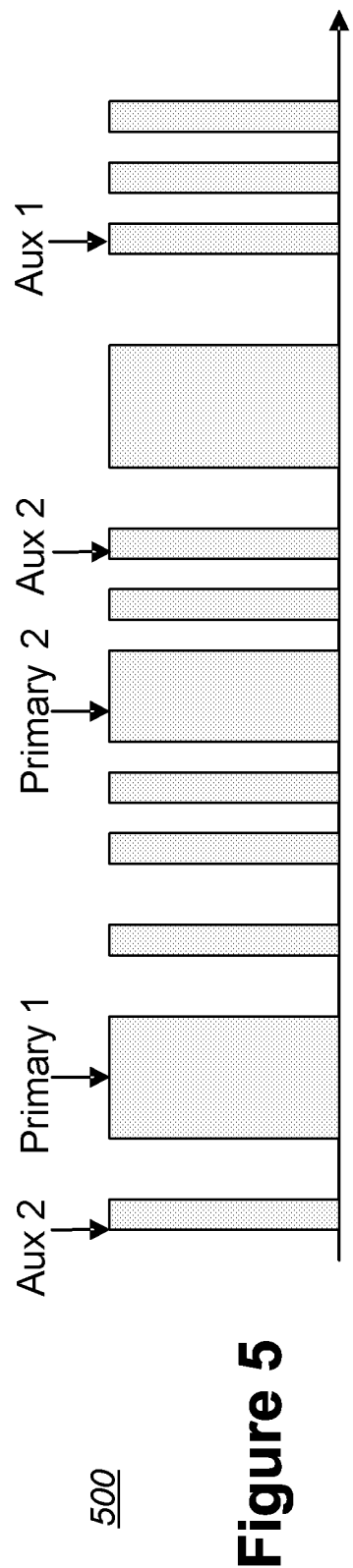
FIG. 5 is a simplified timing diagram illustrating interspersed auxiliary channels, in accordance with one exemplary embodiment of the present invention.

Alternatively, the transmission system or the content provider could make available auxiliary streams that contain low quality (e.g. low resolution) media streams corresponding to the same logical channels that the user is requesting. These auxiliary streams are time-sliced in a different way from the primary streams so that the time slice bursts are smaller, as are the inter time slice intervals. Hence, a receiver may switch to the auxiliary stream faster, requiring less memory in the process to buffer a time slice burst. Once the viewer is being displayed the content from the auxiliary stream, the receiver is able to seek the primary media stream requested by the user. The user experience for logical channel changes is significantly enhanced by this method. FIG. 5 illustrates a simplified timing diagram of auxiliary stream time slices in the presence of the time slices for a corresponding primary stream.

Composite Auxiliary Streams

Figure 6:
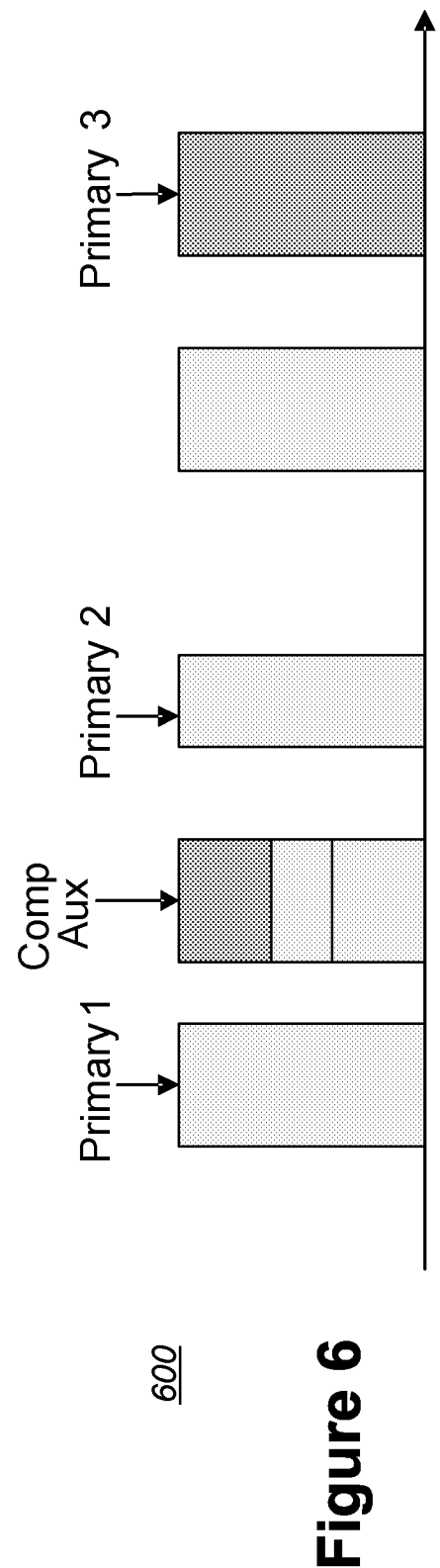
FIG. 6 is a simplified timing diagram illustrating a composite auxiliary channel, in accordance with one exemplary embodiment of the present invention.

A further optimization of this scheme is for the transmission system to bundle all the auxiliary streams into a composite auxiliary stream (bearing a common IP address). The receiver, on entering surf mode, would merely need to receive the composite auxiliary stream to allow the application to display a reduced quality or a low resolution media stream. This may continue until the primary stream is received and successfully decoded by the receiver. A simplified timing diagram of composite auxiliary stream time slices is shown in FIG. 6.

ESG with Embedded Composite Stream and Delta_T Information

The composite auxiliary stream may be embedded within the ESG service. Further, the delta_t information of each service, relative to the ESG stream may be signaled within either the composite auxiliary stream or within the ESG.

Embedding delta_t information within the composite stream or within ESG helps the receiver save power by not having to indefinitely keep the front end running during a logical channel change event.

In addition, there may be supplementary streams that contain targeted advertisements, for instance, that may be provided as fillers to add value for the service provider and to enhance the user experience during channel zapping.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. An apparatus adapted to transmit digital video signals, the apparatus comprising: an input device configured to receive one or more digital video signals corresponding to one or more channels;
    an encapsulator configured to encapsulate the one or more digital video signals to generate a primary data stream, the encapsulator comprising:
        an auxiliary stream processor module configured to generate one or more auxiliary data streams, each auxiliary data stream including a portion of a content associated with one channel; the apparatus configured to divide the primary data stream and the one or more auxiliary date streams into a plurality of time slices, wherein an amount of information containing in a time slice for the one or more auxiliary data streams is less than an amount of information containing in a time slice for the primary data stream;
    an aggregator adapted to aggregate portions of the contents of at least two of the channels so as to generate a composite auxiliary data stream, wherein the aggregator is further adapted to determine an offset time value between a time slice of the primary data stream and a time slice of the composite auxiliary data stream, wherein the offset time value is used to facilitate synchronization of the time slices;
    a multiplexer coupled to the encapsulator for receiving the primary data stream and one or more auxiliary data streams; and
    a modulator coupled to the multiplexer.

2. The apparatus of claim 1 wherein the portion of a content includes reduced resolution content.

3. The apparatus of claim 2 wherein the reduced resolution content includes reduced quality of images.

4. The apparatus of claim 2 wherein the reduced resolution content includes a reduced frame rate.

5. The apparatus of claim 2 wherein the reduced resolution content includes content with a compression ratio higher than a full resolution content.

6. The apparatus of claim 2 wherein said apparatus transmits the digital video signal in accordance with the DVB-H communications standard and said encapsulator is a DVB-H encapsulator.

7. The apparatus of claim 1 wherein the time slice for the one or more auxiliary data streams is offset in time from the time slices for the primary data stream.

8. The apparatus of claim 1 wherein a time slice for the one or more auxiliary data streams has a more frequent occurrence than a time slice for the primary data.

9. The apparatus of claim 1 wherein a time slice for the one or more auxiliary data streams and a time slice for the primary data stream do not overlap with each other.

10. The apparatus of claim 1 wherein the aggregator comprises a delta-t module adapted to determine an offset time value between a time slice of the primary data stream and a time slice of the composite auxiliary data stream.

11. The apparatus of claim 10 wherein the offset time value is used to facilitate fast synchronization of a time slice processing in a receiver.

12. The apparatus of claim 1 wherein the composite auxiliary data stream is embedded in an electronic service guide (ESG) data stream.

13. The apparatus of claim 1 wherein the aggregator inserts an identifier adapted to enable a receiver to relate an auxiliary data stream to a corresponding primary channel.

14. The apparatus of claim 1 wherein the composite auxiliary data stream has an assigned IP address different from an IP address of the one or more channels.

15. A method for transmitting digital video broadcast signal for use in wireless handheld communication, the method comprising:
    receiving one or more digital video broadcast signals including content information of one or more channels to be broadcasted;
    encapsulating the one or more digital video broadcast signals into a primary data stream;
    generating one or more auxiliary data streams, each data stream comprising a portion of a content with one channel;
    dividing the primary and the one or more auxiliary data streams into a plurality of time-slices, wherein an amount of information containing in a time slice for the one or more auxiliary data streams is less than an amount of information containing in a time slice for the primary data stream;
    aggregating portions of the contents of at least two of the channels so as to generate a composite auxiliary data stream, and determining an offset time value between a time slice of the primary data stream and a time slice of the composite auxiliary data stream, wherein the offset time value is used to facilitate synchronization of the time slices; multiplexing the time-slices; and
    modulating the time-slices for distributing over a wireless medium.

16. The method of claim 15 wherein the portion of the content comprises low resolution content corresponding to a full resolution of the one or more channels to be broadcasted.

17. The apparatus of claim 8 wherein the more frequent occurrence of the time slice for the one or more auxiliary data stream enables a receiver to have a fast response time for channel surfing.

* * * * *